May 13, 1958   J. C. RHODES ET AL   2,834,200
CONTINUOUS AUTOMATIC VISCOSIMETER
Filed Dec. 28, 1955   4 Sheets-Sheet 1

INVENTORS.
Joseph C. Rhodes
John P. Segers
BY
Everett A. Johnson
ATTORNEY

INVENTORS.
Joseph C. Rhodes
John P. Segers
BY
Everett A. Johnson
ATTORNEY

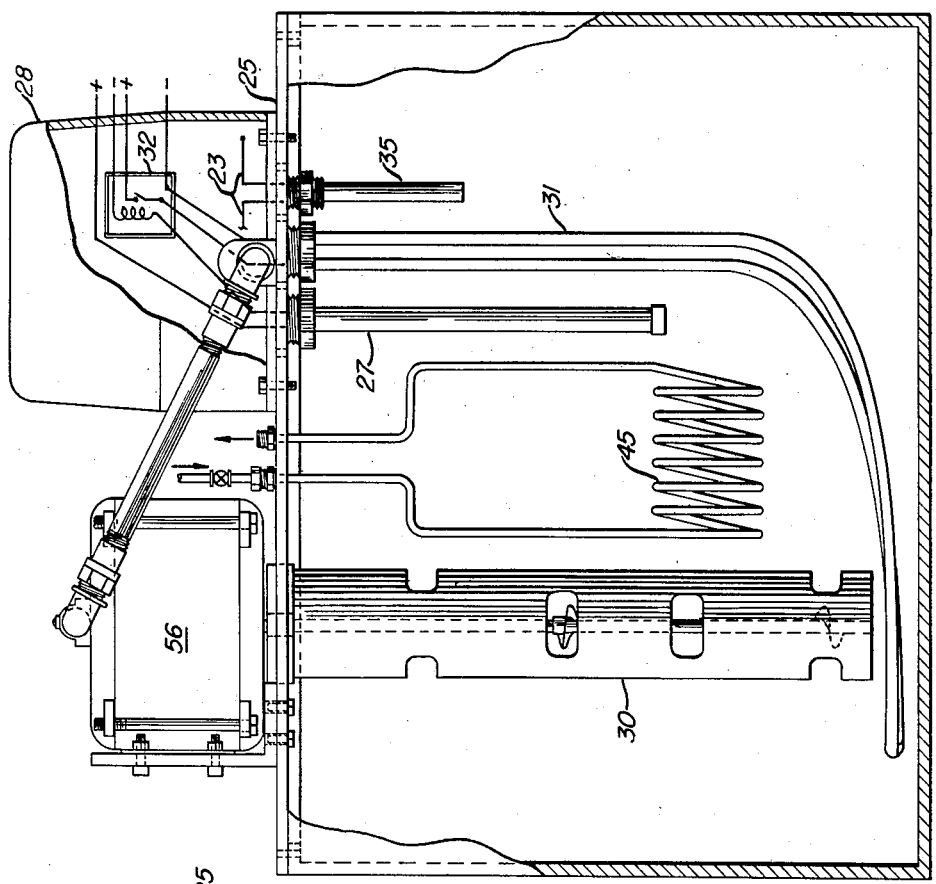
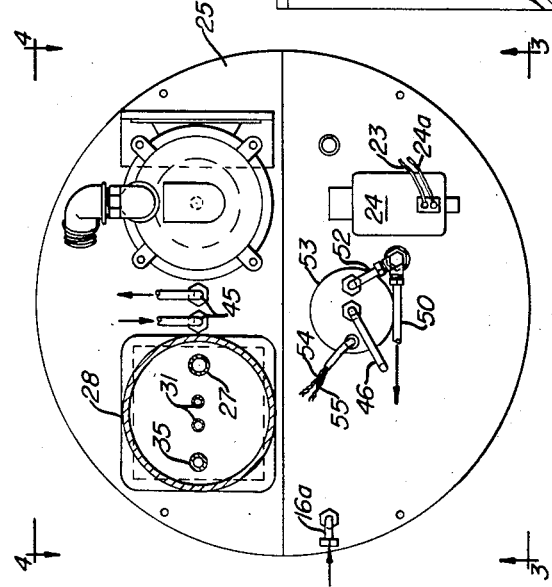
Fig. 4
Fig. 5
INVENTORS.
Joseph C. Rhodes
John P. Segers
BY
Everett A. Johnson
ATTORNEY May 13, 1958    J. C. RHODES ET AL    2,834,200
CONTINUOUS AUTOMATIC VISCOSIMETER
Filed Dec. 28, 1955    4 Sheets-Sheet 4

INVENTORS:
Joseph C. Rhodes
BY    John P. Segers

Everett A. Johnson
ATTORNEY

United States Patent Office 2,834,200
Patented May 13, 1958

2,834,200
CONTINUOUS AUTOMATIC VISCOSIMETER

Joseph C. Rhodes, Park Forest, and John P. Segers, Crete, Ill., assignors to Standard Oil Company, Chicago, Ill., a corporation of Indiana Application December 28, 1955, Serial No. 555,897

8 Claims. (Cl. 73—55)

This invention relates to testing apparatus and, more particularly, pertains to a means for automatically determining the viscosity of a flowing stream of blended liquids.

In many refinery operations there are instances in which it is necessary to measure viscosity and control product quality. Four primary necessities for an instrument to measure viscosity continuously are accuracy, short response time, simplicity of operation, and dependability. Devices heretofore available do not meet the rigorous requirements demanded by the oil industry.

There are inherent weaknesses in blending machines that occasionally result in improper blending and there is also some room for human error in the operation. Likewise, in a blending operation six or seven stocks may be used, the physical properties of which vary over wide ranges and it is sometimes necessary to adjust the percentage of the blend to achieve the proper product results. For these reasons, it is an absolute necessity for the operator of the blending plant to have a means for rapid and continuous checking of the product to assure the desired specifications.

For example, in a motor oil blending operation, the rate of blending is of the order of about 500 G. P. M. and, accordingly, half a tank car of oil can be blended in about 15 minutes. A single run of the blending machine seldom exceeds 30 minutes running time and the majority of runs are 20 minutes or less. Viscosimeters heretofore available are so erratic that the run is completed before the viscosimeters have settled to recording the actual viscosity of the product being manufactured.

Ordinarily, it is necessary to submit a sample of each blend to the inspection laboratory for analysis. However, since it requires approximately 10 to 12 minutes to run a viscosity determination in the laboratory and additional time to shut down the blending machine, take the sample and restart after receiving the inspection report, the delay occurred by laboratory control totals at least 20 minutes on each product. Such a delay is in many instances longer than the total run of each blend and would prevent meeting shipping schedules by delaying barrel fillers, tank car operators, and truckers. Obviously, it is impossible for a laboratory to maintain continuous and timely control on a blending machine that can load half a tank car in the time required to check one viscosity in the laboratory.

It is, therefore, a primary object of this invention to provide an instrument which is accurate, has a short response time, is simple to operate, and is dependable. A further object of the invention is to provide an instrument for continuously determining the viscosity of a blended liquid stream with sufficient accuracy and speed to operate as a plant control apparatus. An additional object is to provide an instrument with a response time of less than about 3 minutes. A further object is to provide an instrument which can continuously measure the viscosity of a hydrocarbon liquid with an accuracy of ±0.2% full scale.

Another important object of the invention is to provide a system wherein the tested sample can be returned to the product line. Additionally, it is an object to provide an instrument that is particularly useful when line pressures and temperatures tend to fluctuate violently. These and other objects of the invention will become apparent as the description thereof proceeds.

Briefly, according to the invention, the liquid from a product line is circulated by a pump at a uniform rate through a bypass loop or circulation system which develops a pressure of about 80 p. s. i. above line pressure. The circulation line pressure is reduced by a pressure regulator to about 40 p. s. i. above line pressure and this pressure forces the oil through heat exchanger means, constant volumetric flow rate metering means, and capillary means, all maintained within a constant temperature means. The constant volumetric flow rate metering means includes a metering device, the slippage across which is controlled by a zero differential pressure regulator means. The metering means is also controlled by a governor and meters the flow of liquid through the capillary means at a uniform rate from which the liquid is returned to the product line. The pressure head for flowing the oil through the apparatus is due solely to the regulated circulation line pressure. The pressure drop across the constant temperature capillary tube is an indication of the viscosity of the liquid under test and a pressure-responsive means may be used to actuate mechanisms for controlling operations so as to obtain a desired blended product. Further details of the invention will be apparent to those skilled in the art as the description thereof proceeds with reference to the accompanying drawings wherein:

Figures 3 and 4 are elevations illustrating details of one embodiment of the device;

Figure 5 is a fragmentary top view of the device of Figures 3 and 4; and

Figure 1:
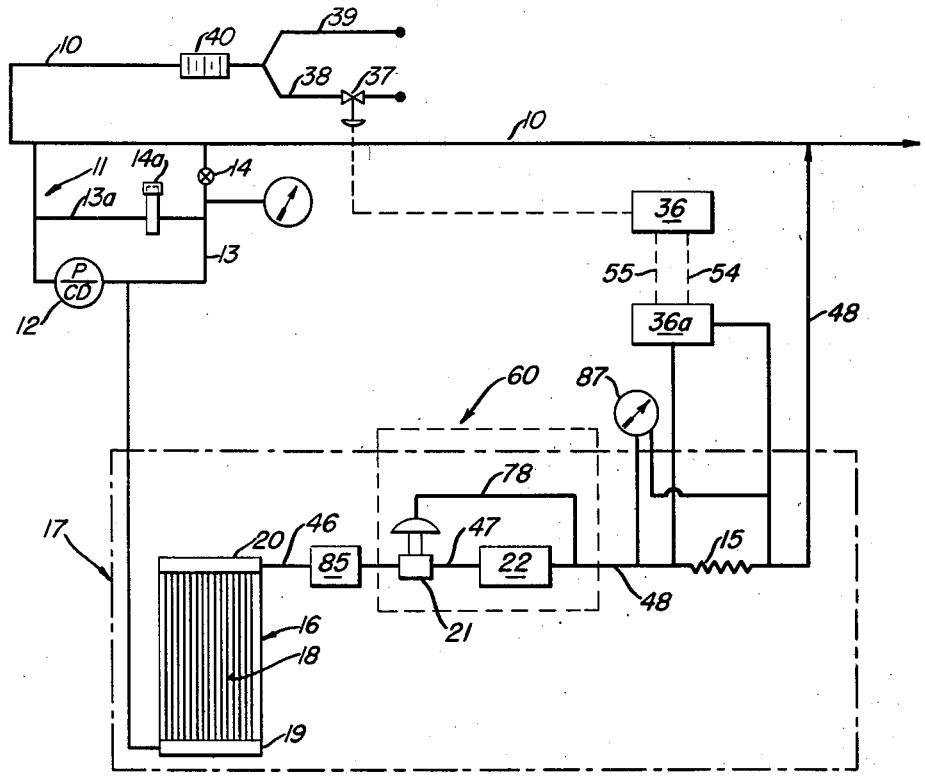
Figure 1 is a schematic representation of the system.

Referring to the drawings, the sample of liquid is withdrawn from the product line 10 by the circulation system 11 which includes circulating pump 12 on valved line 13. The circulating pump 12 has a capacity of about 2.5 G. P. M. and can deliver a pressure up to about 200 p. s. i. which brings the sample to the instrument quickly and has the capacity to raise the pressure of the sample stream high enough above manifold pressure to furnish an adequate feed for the entire flow through the instrument. The needle valve 14 in the circulating system 11 is set so that the pressure in line 13 ahead of it is greater than the product line pressure. A safety relief valve 14a on line 13a is connected across the pump 12.

Figure 3:
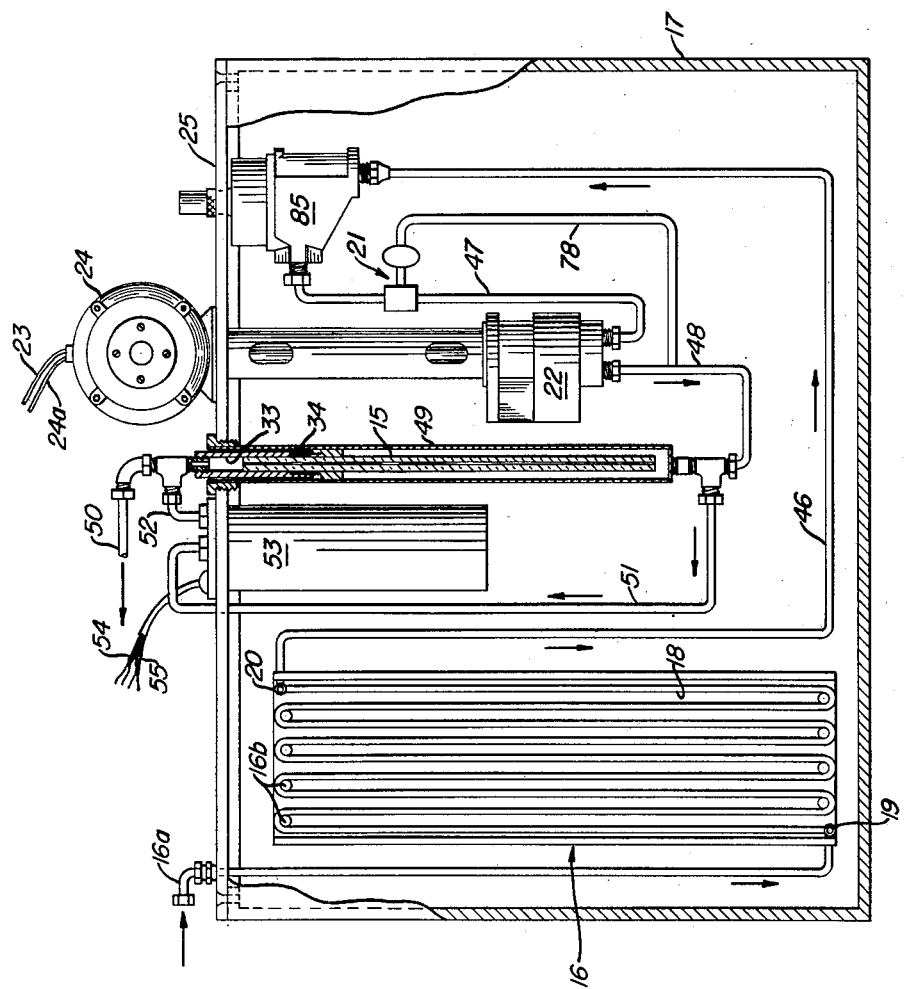

The portion of the sample discharged via line 13 from the circulating system 11 is passed by line 16a through a pressure regulator and through a heat exchanger 16 which is submerged in a constant temperature bath 17. The heat exchanger 16 comprises many parallel strands of small tubing 18, each being of equal length and connected to an inlet heat exchanger manifold 19 and an outlet heat exchanger manifold 20. Referring to Figure 3, a plurality of looped tubes 18 extend between manifolds 19 and 20 as shown schematically in Figure 1. This particular design of heat exchanger has the advantages that the exchanger is of a small capacity thereby giving short response time and the parallel strands 18 prevent excessive pressures being required to force the oil rapidly through the exchanger 16. From the heat exchanger 16 the liquid passes through a constant volumetric flow rate metering means 60 including the meter means 22 of the driven impeller type and a regulator valve 21 which maintains a zero pressure differential across the meter 22. Thus, the meter slippage will be zero even if extreme fluctuations in product line pressure should occur.

The volumetric meter 22 may be of the reciprocating piston type, the oscillating rotating piston type, or the nutating disc type. We provide the meter 22 with a governor so as to produce a constant volumetric flow rate metering means, one suitable governor being a synchronous motor 24 adapted to drive the volumetric meter 22.

From the zero differential pressure regulator 21 the liquid flows through the meter 22, the speed of rotation of which is governed by synchronous motor 24. This meter 22 gates liquid, flowing under a head from the circulation system 11, at a constant rate, for example at about 70 cc. per minute, into the capillary 15 which acts as a restriction to the flow of the liquid.

Zero differential pressure regulator 21 and the meter 22 together comprise the metering means 60 for the system and the pressure head necessary to flow the test fluid through the apparatus is supplied by the circulating system 11 upstream of the pressure regulator 85. Thus, it will be seen that the sole function of the meter 22 is to gate the fluid at a constant volume at a pressure corresponding to the pressure drop across the capillary 15 and with a zero differential pressure across the inlet and outlet of the meter. It will be understood, however, that it is necessary that the line pressure ahead of the zero differential pressure regulator must always be higher than the highest pressure drop that will be encountered across the capillary 15. Thus, a pressure regulator 85 upstream of the metering means 60 may suitably be set at about 40 p. s. i. above line pressure.

Figure 6:
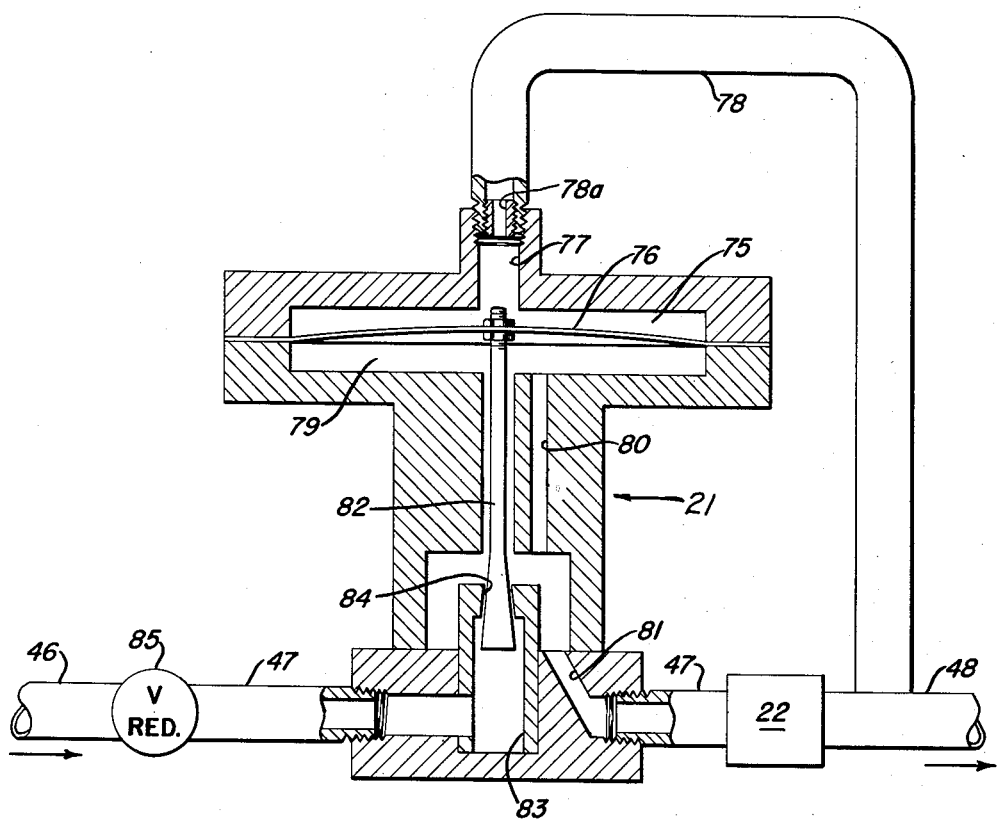
Figure 6 illustrates a preferred constant volume metering means for use in our system.

Referring to Figure 6, the body 70 of the regulator valve, designated generally by the reference number 21 in Figure 1, and having inlet 71 and outlet 72 is on line 73 in series with the metering means 22. The upper chamber 75 above the diaphragm 76 is provided with port 77 connected by impulse line 78 to line 47 on the downstream side of meter 22. The pressure downstream of the meter 22 depends on the pressure drop across the capillary 15. For example, assuming this pressure drop to be 10 p. s. i., then a pressure of 10 p. s. i. is applied to the diaphragm 76 in chamber 75. This diaphragm 76 will be moved until the pressure in the active or lower chamber 79 is equal to that in chamber 75. The lower chamber 79 communicates by channels 80 and 81 with the downstream side of regulator 21 and hence with the upstream side of the meter 22 via line 47.

As the diaphragm 76 is flexed downwardly, the tapered valve member 82 within the orifice 83 likewise moves downwardly and increases the flow opening 84 through which the liquid flows from inlet 71 into outlet 72 and thus tends to increase the pressure downstream from the pressure regulator assembly 21. Conversely, the meter 22 tends to restrict excessive flow through the regulator 21 causing a back pressure to be transmitted through channels 80 and 81 to chamber 79 which raises the diaphragm 76 and the valve rod 82 to restrict flow through the orifice 84 until equilibrium pressure is attained.

The capillary 15 ordinarily is of glass and has an O. D. of 0.25 inch. For a viscosity range of up to 3 centipoises a length of about 8 inches of such tubing with an I. D. of 0.025 inch is satisfactory. For a range up to 1000 centipoises, a length of about 10 inches and an I. D. of 0.100 inch can be used.

The principle of operation is based on Poiseuilles equation, $$\eta = p\frac{r4}{8lv}$$

where $\eta$ is viscosity (in absolute units), $r$ is the radius of the tube through which the liquid flows, $l$ is the length of the tube, $v$ is the volume of liquid per unit time, and $p$ is the pressure drop across the tube. All values are kept constant except $\eta$, which will then be a linear function of the pressure drop $p$ across the restrictive capillary 15. This drop is directly proportional to absolute viscosity of the liquid.

Figure 2:
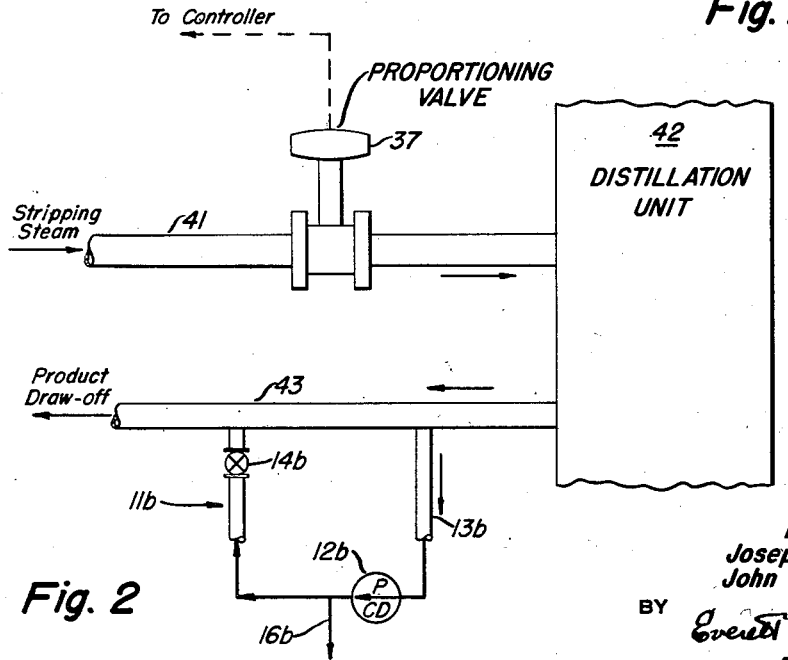
Figure 2 shows details of an installation wherein product viscosity controls distillation.

A differential pressure is sensed across the capillary 15 and indicated by differential gauge 87. The pressure is not itself recorded, but is converted by strain gauge 36a to an electrical signal which is correlated with absolute viscosity or used to control operations as illustrated in Figures 1 and 2, the signal from 36a being fed to controller 36. The controller 36 operates the proportioning valve 37 and thereby controls the blended product in line 10, an increment of which is forced by circulating system 11 and line 16a through the viscosimeter device of Figure 1. In Figure 1, the proportioning valve 37 controls the flow of a first base stock in line 38 into line 39 carrying a second base stock at a constant flow rate and merging with product line 10. A mixer 40 in manifold line 10 commingles the materials from lines 38 and 39 prior to taking the sample from product line 10 by circulating system 11.

In Figure 2, the proportioning valve 37a controls the introduction of stripping steam via line 41 into a distillation unit 42 to control the viscosity of the product which is removed by draw-off line 43. As in the case of Figure 1, the sample is removed from the product line 43 in the same manner as described with respect to line 10 in Figure 1 for the determination of the stream viscosity.

Referring to Figures 3, 4 and 5, we have illustrated one embodiment of the invention for the control of operations in blending lubricating oil.

The portion of the withdrawn sample to be passed through the instrument is introduced via line 16a to the heat exchanger 16, supported within the bath 17, and which comprises a plurality of strands of ⅛ inch O. D. copper tubing 18, each strand having a length of about nine feet and being connected in parallel with the other strands to an inlet heat exchanger manifold 19 and an outlet heat exchanger manifold 20. The individual strands are threaded about the exchanger supports 16b as shown in Figure 3.

This particular design of heat exchanger 16 has the advantage that it is of small capacity thereby giving short response time. Further, the use of parallel flow strands 18 avoids the necessity for excessive pressures to force the oil at the metered rate through the exchanger 16.

From the outlet manifold 20 the liquid under test is conducted by line 46 through the pressure regulator 85, zero differential pressure regulator 21, and thence by line 47 through meter 22 driven by the motor 24. The pressure regulating valve 21 maintains a zero pressure differential across the meter 22 thereby making the slippage zero regardless of the viscosity of the liquid being pumped. The meter 22 passes liquid at a constant rate via line 48 into the capillary 15 which may be mounted by neoprene sleeve 34 within the capillary housing 49 which is supported by plate 25. A fitting 33 secures the neoprene sleeve 34 holding the capillary 15 which vents into line 50 which returns the sample under pressure to the product line 10 of Figure 1.

A strain gauge means 53 is supported at its upper end by plate 25 and extends within the temperature controlled bath 17. Pressure lines 51 and 52 across the capillary assembly 49 communicate with the differential strain gauge 53 whereby a pressure differential, directly proportional to the absolute viscosity of the liquid flowing therethrough, is sensed. The signal from the strain gauge means 53 is carried by leads 54 and 55 to the control mechanism 36 for actuating the valve 37 as described in connection with Figures 1 and 2.

The constant temperature bath 17 holds, for example, about 8 gallons of 10W lube oil stirred by stirrer 30 and the bath 17 is insulated with a spun glass wall which should be maintained free of oil. Thermoregulator 27 controls the temperature of the bath 17 and is mounted in the dome 28 above the bath 17. The thermoregulator 27 is mounted in a steel sleeve for explosion proofing and the sleeve is partially filled with mercury to insure good thermal contact between the regulator 27 and the liquid in the bath 17. Under normal conditions, the bath temperature does not vary more than about ±0.15° F. from the controlled temperature.

A bath heater 21, the size of which is determined by the temperature at which the viscosity is to be measured and by the temperature of the incoming sample, is mounted under the dome 28 above the bath 17 and is controlled by a mercury relay 32 mounted in the dome 28. The relay 32 is turned on and off by the thermoregulator 27 which in turn controls the heater 31.

The dome 28 is explosion proof and encloses the wiring for the thermoregulator 27, the mercury relay 32, the terminals of the heater 31 and a thermoswitch 35 which prevents operation of the meter 22 before the bath 17 has reached proper temperature. It is in electrical series with the synchronous motor 24 and is set so that it will close only when the bath temperature is within 10° of its final setting.

The water coolant coil 45 is supported below the plate 25 within the bath 17 and is used to reduce the temperature of the bath 17 when the bath temperature is near ambient temperature or where the temperature of the sample introduced into the instrument is high enough to overheat the bath and override the thermoregulator 27. Where the coolant is used, the relay 32 can operate the solenoid valve 62 which stops flow of coolant through coil 45 during the period in which the heater 31 is on.

Referring to the zero differential pressure regulator 21 and, in particular impulse line 78, we may provide a flow restriction such as an orifice 78a to dampen any fluctuations in flow through capillary 15 due to the movement of the diaphragm 76 which displaces fluid from chamber 75 into line 78 and hence into line 48 leading to the capillary 15. It will be appreciated that the orifice 78a may be placed in channel 81 communicating between the lower chamber 79 and the line 47.

This application is a continuation-in-part of our now abandoned co-pending application Serial Number 389,410, filed October 30, 1953, and entitled "Continuous Recording Viscosimeter."

Although we have described the invention in terms of examples which are set forth in some detail, it should be understood that these are by way of illustration only and that our invention is not limited thereto and alternative embodiments will become apparent to those skilled in the art in view of our description of the invention. Accordingly, modifications in our invention are contemplated without departing from the spirit thereof.

What we claim is:

1. A continuous flow viscosimeter apparatus including a product line, a closed high pressure circulating system in parallel with said line, a first sample conduit leading from said system, a heat exchanger providing a multiplicity of parallel flows therethrough said heat exchanger including an inlet manifold, an outlet manifold, and a multiplicity of tubing strands providing parallel flow between said manifolds, said first conduit discharging into said inlet manifold, a discharge line from the outlet manifold of said heat exchanger, a constant volumetric flow rate metering means connected to said discharge line, said metering means comprising a metering device and a zero differential pressure regulator across the inlet and outlet of said metering device, said differential pressure regulator maintaining a constant pressure differential across the metering device such that the slippage of the metering device is substantially constant regardless of the viscosity of the sample passing therethrough, a capillary in said discharge line and means in series with said metering means, and a second conduit means in series flow with said capillary means for returning the sample to said product line.

2. A continuous flow viscosimeter apparatus including a multi-branched heat exchanger having an inlet header and an outlet header, said heat exchanger including an inlet manifold, an outlet manifold, and a multiplicity of tubing strands providing parallel flow between said manifolds, a constant temperature bath containing said heat exchanger, a constant volumetric flow rate metering means in series with the outlet of said heat exchanger, said metering means consisting essentially of a metering device and a zero differential pressure regulator across the inlet and outlet of said metering device, said differential pressure regulator maintaining a constant pressure differential across the metering device such that the slippage of the metering device is substantially constant regardless of the viscosity of the liquid passing therethrough, a pressure regulator interposed said heat exchanger and said metering means, capillary means in series flow with said metering device, and pressure differential responsive means across the inlet and outlet of the said capillary means.

3. A continuous flow viscosimeter apparatus including a product line means, heat exchanger means, said heat exchanger means including an inlet manifold, an outlet manifold, and a multiplicity of tubing strands extending therebetween and providing a multiplicity of parallel flows, a high pressure sample circulating system discharging a sample flow from said product line means into said heat exchanger means, a sample discharge line from said heat exchanger means, a first pressure regulator means on said discharge line in series flow with and downstream of said heat exchanger means, flow metering means downstream of said pressure regulator on said discharge line, capillary means in series flow with said discharge line downstream of said metering means, zero differential pressure regulator means in series with said metering means, differential pressure responsive means at the inlet of said capillary means responsive to the pressure drop across said capillary means, and conduit means into which said capillary means discharges to return the sample to said product line means.

4. A continuous flow viscosimeter apparatus including in combination a constant temperature bath, means for heating said bath, separate means for cooling said bath, a heat exchanger submerged within said bath and consisting essentially of an inlet header and an outlet header with a multiplicity of small diameter tubes between said headers to provide parallel flow therebetween, means exterior of said bath supplying sample liquid to said inlet header under pressure, a metering means submerged in said bath, differential pressure regulator means across said metering means, said regulator maintaining a zero pressure differential across the inlet and outlet of said metering means, a restricted flow capillary means disposed within said bath, conduit means extending from the outlet of said metering means and discharging into the inlet end of the said capillary, and a pressure differential sensing means connecting across the inlet and outlet of said capillary.

5. An apparatus for continuously blending hydrocarbon stocks of different viscosity to produce a blended stream of desired viscosity which comprises in combination a sampling pumping system including a transfer line through which the blended product flows, a circulating line having an inlet and an outlet in communication with said transfer line, a circulating pump in said line, a flow restricting valve in said line between the outlet of said pump and said transfer line, a branch sampling line diverting flows from said transfer line, a branch sampling line diverting flows from said circulating line intermediate said valve and said pump, said viscosity-responsive apparatus comprising heat exchanger means into which said branch sampling line discharges, said heat exchanger including a pair of spaced manifolds and a multiplicity of looped tubing strands providing parallel flow between said manifolds, a conduit means extending from the discharge manifold of said heat exchanger, a capillary means in said conduit means, a driven metering means, a pressure regulator communicating with said conduit means upstream and downstream of said metering means, means maintaining a constant pressure differential across the metering means thereby making slippage in the metering means constant regardless of the viscosity of the liquid stream passing therethrough, a pressure-differential responsive means across a length of the capillary in said capillary means, and means for maintaining said capillary, differential pressure regulator, heat exchanger and metering means at a constant temperature.

6. An apparatus adapted for use in continuously blending hydrocarbon stocks of different viscosity to produce a blended stream of desired viscosity, which comprises in combination a transfer line through which the blended product flows, a circulating line having an inlet and an outlet in communication with said transfer line, a circulating pump in said circulating line, a flow restricting valve in said circulating line between the outlet of said pump and said transfer line, a sampling line communicating with said circulating line intermediate said pump and said valve, a heat exchanger into which said sampling line discharges, said heat exchanger including a pair of spaced manifolds and a multiplicity of looped tubing strands arranged for flow of a multiplicity of small streams in parallel between said manifolds, conduit means extending from the discharge side of said heat exchanger, a capillary means, driven metering means on said conduit, a differential pressure regulator in communication with said conduit upstream and downstream of said metering means, a pressure-differential responsive means across the ends of the capillary in said capillary means, a constant temperature means, said capillary means, pressure-differential responsive means, heat exchanger and metering means being maintained within said constant temperature means, and a return line in fluid connection between the end of said conduit and said transfer line downstream of said sampling line.

7. A continuous flow viscosimeter apparatus including in combination a constant temperature bath, means for heating said bath, separate means for cooling said bath, a heat exchanger submerged within said bath and consisting essentially of an inlet header and an outlet header with a multiplicity of small diameter tubes in looped array between said headers to provide parallel flow therebetween, a pressure regulator mounted on said bath and having its inlet side connected to said outlet header, driven metering means submerged in said bath and having its inlet connected to the outlet of said pressure regulator, said regulator maintaining a constant pressure differential across the inlet and outlet of said metering means, a restricted flow capillary means disposed in said bath, said capillary means consisting essentially of a casing having an inlet and an outlet, a capillary removably mounted axially of said casing and across the flow area thereof, a conduit means extending from the outlet of said metering means and discharging into the inlet end of the said casing about said capillary, and a pressure differential sensing means connected across the inlet and outlet of said capillary disposed within said casing.

8. A continuous flow viscosimeter apparatus having a short response time including a heat exchanger means comprising an inlet header and an outlet header with a plurality of uniform looped flow strands arranged for parallel flow between said inlet and outlet headers, said heat exchanger being of small liquid capacity thereby giving short response time and being of low resistance to flow therethrough, metering means including a driven meter connected in series with the said outlet header, pressure regulator valve means maintaining constant pressure differntial across said meter thereby making the meter slippage constant regardless of changes in viscosity of fluid passing therethrough, capillary means receiving the total discharge from said meter in series, said capillary means including a tubular housing having an inlet and an outlet, a capillary tube mounted within said housing intermediate said housing inlet and said outlet so that flow through said housing is through said capillary, differential pressure-responsive means connected across said capillary means whereby the pressure differential changes are directly proportional to the absolute viscosity of the liquid flowing through the apparatus, and a constant temperature bath means within which are disposed said heat exchanger means, meter means and capillary means.

References Cited in the file of this patent

UNITED STATES PATENTS

| | | |
|---|---|---|
| 1,863,090 | Albersheim et al. | June 14, 1932 |
| 2,038,432 | Konheim et al. | Apr. 21, 1936 |
| 2,042,860 | Peabody et al. | June 2, 1936 |
| 2,322,814 | Binckley | June 29, 1943 |

UNITED STATES PATENT OFFICE
Certificate of Correction

Patent No. 2,834,200                             May 13, 1958

Joseph C. Rhodes et al.

It is hereby certified that error appears in the printed specification of the above numbered patent requiring correction and that the said Letters Patent should read as corrected below.

Column 3, lines 72 to 74, the equation should appear as shown below instead of as in the patent:

$$\eta = p \frac{\pi r^4}{8lv}$$

column 5, line 61, after "therethrough" insert a comma; line 75, strike out "in said discharge line and"; same line 75, after "means" insert —in said discharge line and—; column 6, line 60, strike out "connecting" and insert instead —connected—; lines 70 and 71, strike out "a branch sampling line diverting flows from said transfer line,"; line 73, strike out "said", third occurrence, and insert instead —and a—.

Signed and sealed this 19th day of August 1958.

[SEAL]

Attest:
KARL H. AXLINE,
*Attesting Officer.*

ROBERT C. WATSON,
*Commissioner of Patents.*